US009111429B2

(12) United States Patent
Kim

(10) Patent No.: US 9,111,429 B2
(45) Date of Patent: Aug. 18, 2015

(54) APPARATUS AND METHOD FOR MANAGING ALARMS OF SYSTEM

(71) Applicant: LSIS CO., LTD., Anyang-si, Gyeonggi-do (KR)

(72) Inventor: Tae Ho Kim, Anyang-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 114 days.

(21) Appl. No.: 13/729,482

(22) Filed: Dec. 28, 2012

(65) Prior Publication Data

US 2013/0187769 A1 Jul. 25, 2013

(30) Foreign Application Priority Data

Jan. 2, 2012 (KR) ........................ 10-2012-0000300

(51) Int. Cl.

| | |
|---|---|
| ***G05B 11/01*** | (2006.01) |
| ***G08B 29/00*** | (2006.01) |
| ***G08B 19/00*** | (2006.01) |
| ***G08B 23/00*** | (2006.01) |
| ***G08B 1/08*** | (2006.01) |
| ***G08B 5/00*** | (2006.01) |
| ***G08B 21/00*** | (2006.01) |
| ***G08B 25/14*** | (2006.01) |

(52) U.S. Cl.
CPC ................ *G08B 29/00* (2013.01); *G08B 25/14* (2013.01)

(58) Field of Classification Search
CPC ...... G08B 25/14; G08B 19/00; G08B 21/182; G08B 21/00; G08B 21/18; G08B 29/185; G08B 29/02; G08B 23/00; G05B 23/0272; G01D 7/00
USPC ........... 340/12.54, 506, 521, 500, 539.1, 519, 340/815.4, 815.43, 540, 517, 515
See application file for complete search history.

(56) References Cited

U.S. PATENT DOCUMENTS

| | | | | | |
|---|---|---|---|---|---|
| 4,808,971 | A | * | 2/1989 | Graham et al. | 340/521 |
| 4,812,819 | A | * | 3/1989 | Corsberg | 340/517 |
| 5,581,242 | A | * | 12/1996 | Arita et al. | 340/691.6 |

(Continued)

FOREIGN PATENT DOCUMENTS

| | | |
|---|---|---|
| CN | 101281679 | 10/2008 |
| CN | 101401135 | 4/2009 |

(Continued)

OTHER PUBLICATIONS

Korean Intellectual Property Office Application Serial No. 10-2012-0000300, Office Action dated Feb. 27, 2013, 4 pages.

(Continued)

*Primary Examiner* — George Bugg
*Assistant Examiner* — Munear Akki
(74) *Attorney, Agent, or Firm* — Lee, Hong, Degerman, Kang & Waimey

(57) ABSTRACT

Disclosed are an apparatus and a method for managing alarms based on state information received from systems. The method includes receiving alarms including state information of a remote control system; displaying an alarm queue including at least one of the received alarms; setting important alarms from among the alarms displayed in the alarm queue; and deleting the important alarm from the alarm queue when a user confirms the important alarm or a signal notifying a recovery to a normal state of a system corresponding to the important alarm is received.

16 Claims, 8 Drawing Sheets

(56) References Cited

U.S. PATENT DOCUMENTS

| | | | | | |
|---|---|---|---|---|---|
| 6,058,420 | A * | 5/2000 | Davies | 709/224 |
| 6,356,282 | B2 * | 3/2002 | Roytman et al. | 715/736 |
| 6,535,122 | B1 * | 3/2003 | Bristol | 340/506 |
| 7,502,854 | B2 * | 3/2009 | Luo et al. | 709/224 |
| 8,205,244 | B2 * | 6/2012 | Nightingale et al. | 726/3 |
| 8,266,530 | B2 * | 9/2012 | Harnois et al. | 715/736 |
| 8,269,620 | B2 * | 9/2012 | Bullemer et al. | 340/506 |
| 2002/0012011 | A1 * | 1/2002 | Roytman et al. | 345/736 |
| 2003/0156030 | A1 | 8/2003 | Lee et al. | |
| 2008/0209517 | A1 * | 8/2008 | Nightingale et al. | 726/3 |
| 2008/0256217 | A1 * | 10/2008 | Park et al. | 709/218 |
| 2010/0156654 | A1 * | 6/2010 | Bullemer et al. | 340/691.6 |
| 2010/0169595 | A1 * | 7/2010 | Bryant-Rich | 711/162 |
| 2013/0169816 | A1 * | 7/2013 | Hu et al. | 348/159 |

FOREIGN PATENT DOCUMENTS

| | | |
|---|---|---|
| CN | 101662382 | 3/2010 |
| JP | 2010-009463 | 1/2010 |
| KR | 10-2001-0053866 | 7/2001 |
| KR | 1020050040148 | 5/2005 |
| KR | 1020060128527 | 12/2006 |
| KR | 1020070042435 | 4/2007 |

OTHER PUBLICATIONS

The State Intellectual Property Office of the People's Republic of China Application Serial No. 201310001173.0, Office Action dated Sep. 29, 2014, 10 pages.

* cited by examiner

300

APPARATUS AND METHOD FOR MANAGING ALARMS OF SYSTEM

BACKGROUND

The embodiment relates to an apparatus and a method for managing alarms based on state information received from a system.

In general, various automatic systems or remote control systems employ a separate alarm system existing in a remote place to integrally manage the systems.

The alarm system transceives state information of a plurality of systems connected to the alarm system to generate and process alarm information of corresponding systems.

An alarm queue generally displays a variety of alarm information by classifying the alarm information using colors or fonts based on the state of the alarms.

When the alarms are displayed, if the alarms are continuously generated from the system, the alarm corresponding to the system which is not recovered to the normal state may disappear from the alarm queue due to new alarms. Thus, the user may not know the state of the system and cannot recognize whether the system is recovered to the normal state based on the alarm of the abnormal state.

Therefore, the recovery to the normal state and the treatment for the system, which is in the abnormal state, may not be carried out.

In addition, the alarms disappearing from the alarm queue may be stored in a database, but the user is requested to input separate search signals to extract the alarms from the database.

SUMMARY

The embodiment provides an apparatus and a method for managing alarms, capable of continuously managing/observing the state of a system corresponding to the alarm by separately managing the alarms based on the setting of important alarms.

The embodiment provides an apparatus and a method for managing alarms, capable of effectively managing the alarms by classifying the alarms received from a system such that the user can easily recognize the alarms.

A method for managing alarms of a system according to the embodiment includes receiving alarms including state information of a remote control system; displaying an alarm queue including at least one of the received alarms; setting important alarms from among the alarms displayed in the alarm queue; and deleting the important alarm from the alarm queue when a user confirms the important alarm or a signal notifying a recovery of a system corresponding to the important alarm to a normal state is received.

An apparatus for managing alarms of a system according to the embodiment includes an alarm receiving unit that receives alarms from systems connected to an alarm management apparatus, the alarms including state information of the systems; a storing unit that stores information about the received alarms and at least one setting item for classifying the alarms as important alarms; a display unit that displays an alarm queue including at least one of alarm items for setting the important alarms from among the alarms, which are received in the alarm receiving unit and include the state information of the systems; a user input unit that receives a confirmation signal of a user for the alarms displayed in the alarm queue; and a control unit that controls to display the alarm queue including at least one important alarm to be displayed and controls a display state of the alarm queue according to a confirmation of the user for the alarms through the user input unit.

DETAILED DESCRIPTION OF THE EMBODIMENTS

Figure 1:
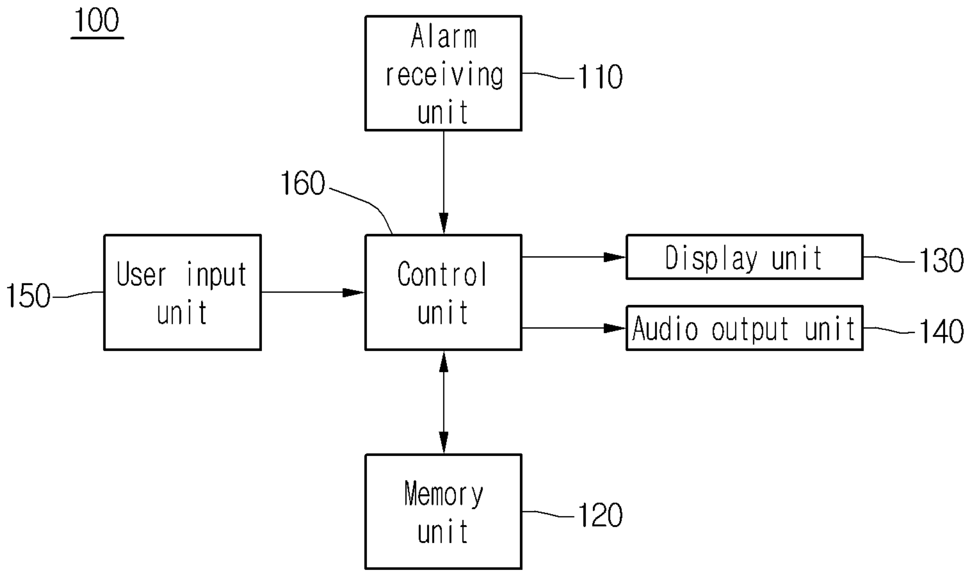
FIG. 1 is a block diagram of an alarm management apparatus according to the embodiment.

Terms and words used in the specification and the claims shall not be interpreted as commonly-used dictionary meanings, but shall be interpreted as to be relevant to the technical scope of the invention based on the fact that the inventor may property define the concept of the terms to explain the invention in best ways.

Therefore, the embodiments and the configurations depicted in the drawings are illustrative purposes only and do not represent all technical scopes of the embodiments, so it should be understood that various equivalents and modifications may exist at the time of filing this application.

FIG. 1 is a block diagram of an alarm management apparatus according to the embodiment.

Referring to FIG. 1, the alarm management apparatus according to the embodiment includes an alarm receiving unit 110, a memory unit 120, a display unit 130, an audio output unit 140, a user input unit 150 and a control unit 160.

The alarm receiving unit 110 may receive alarms from a remote system or systems connected to the alarm management apparatus 100 and the alarms may include state information of the systems The alarm receiving unit 110 may receive the alarms from the systems and the alarms may include position information and state information of the systems.

The memory unit 120 may store information about the alarm received in the alarm receiving unit 110. In addition, the memory unit 120 may store information about classification of the alarm display generated upon the request of the user. According to the embodiment, the memory unit 120 may store the alarms deleted from an alarm queue, which displays at least one alarm, due to the recovery of the system to the normal state, confirmation of the user or the request of the user. The memory unit 120 may store preset important alarms from the alarms received from the systems.

The display unit 130 may display the alarm queue, which includes at least one alarm received in the alarm receiving unit 110 and including the state information of the system. The display unit 130 may display the alarms in the alarm queue under the control of the control unit 160 such that the alarms may be classified according to the state of the system, confirmation of the user for the alarms and the important alarms.

The audio output unit 140 may output various audio signals. According to the embodiment, the audio output unit 140 may output the audio signals corresponding to the receiving of the alarm in the alarm receiving unit 110, the state of the alarms or the state information of the alarms preset as the important alarms.

The user input unit 150 may receive signals from external apparatuses to receive key input signals from the user. In general, the user input unit 150 receives the key input signal or alarm control signals which are received from the external apparatuses in wired/wireless manner. Especially, according to the embodiment, the user input unit 150 may receive the signal from the user to set the important alarms from the alarms displayed in the alarm queue. In addition, the user input unit 150 may receive command signals for deletion, addition or search for the alarms displayed in the alarm queue.

The control unit 160 processes the alarm signals received in the alarm receiving unit 110 to allow the display unit 130 to display the alarms in the alarm queue. When a new alarm is received, the control unit 160 deletes the alarm, which is firstly input from among the alarms displayed in the alarm queue, and displays the new alarm in the highest rank. The control unit 160 may classify the alarms in such a manner that the alarms set as the important alarms by the user may be displayed in the alarm queue while being distinguished from general alarms. In addition, the control unit 160 can control the alarms such that the important alarms can be continuously displayed without being deleted unless there is release or deletion of the important alarms by the user even if the new alarm is received.

The control unit 160 can classify the alarms displayed in the alarm queue based on the state of the systems corresponding to the systems and the confirmation of the alarms by the user and can assign the alarm mark according to the above classification.

If there is an important alarm setting condition preset by the user, the control unit 160 may determine whether the new alarm or the general alarms match with the important alarm setting condition. If it is determined that there is an alarm matching with the important alarm setting condition, the control unit 160 may set the alarm as an important alarm.

Hereinafter, the method for managing the alarms in the alarm management apparatus according to the embodiment will be described with reference to FIGS. 2 to 7.

Figure 2:
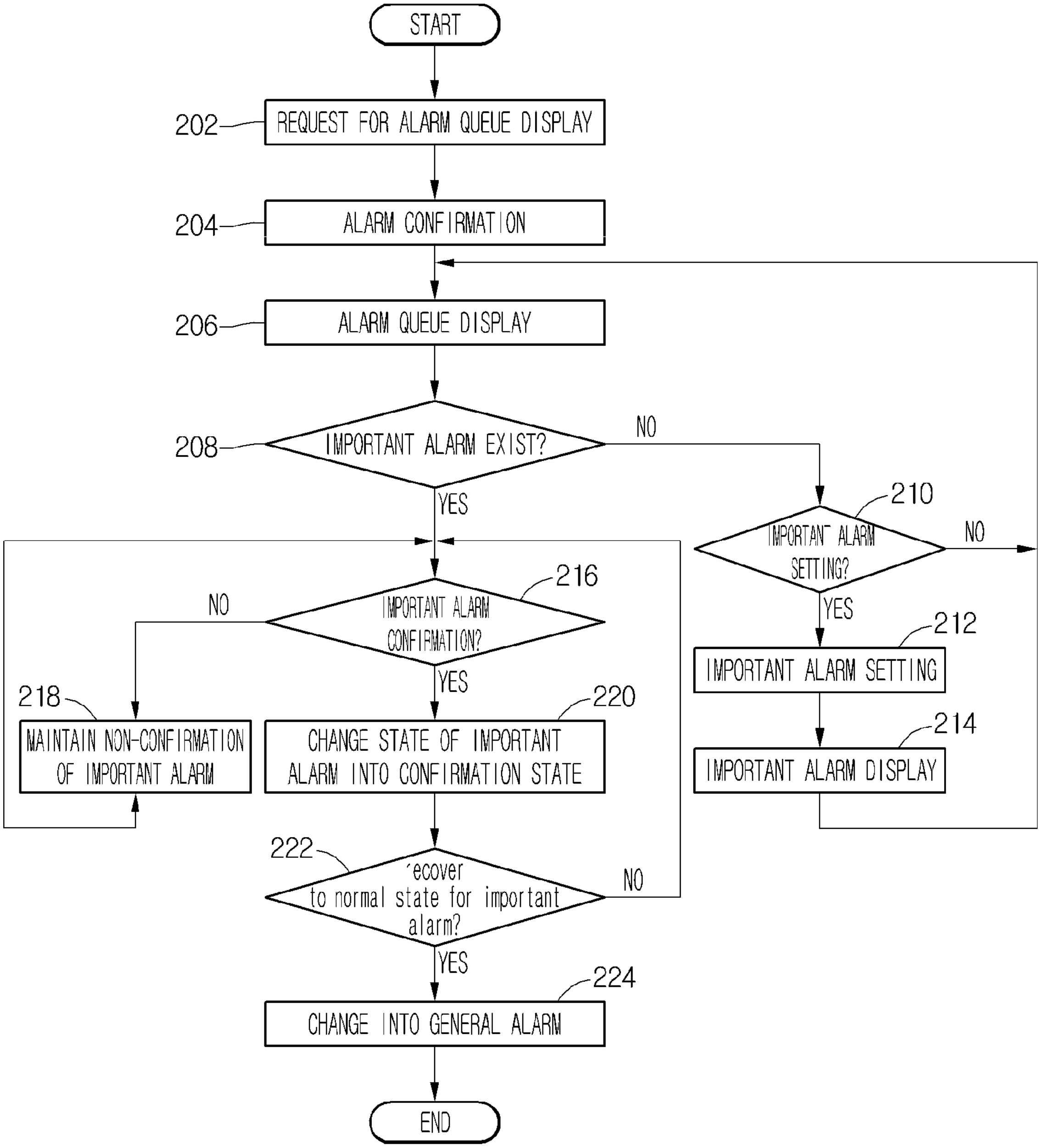
FIG. 2 is a flowchart showing the procedure for setting important alarms according to the embodiment.
Figure 3:
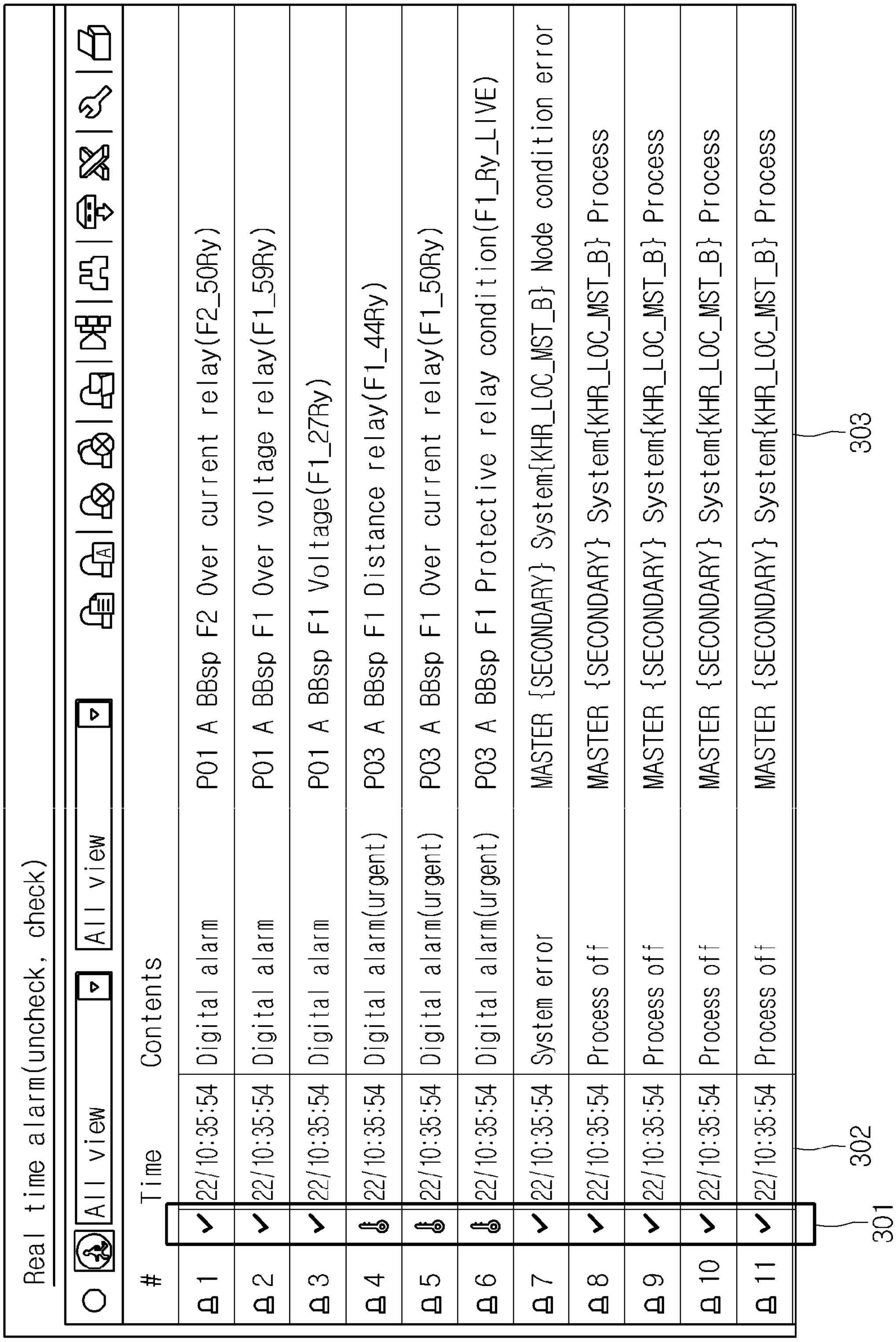
FIG. 3 is a view showing a screen image displaying an alarm queue according to the embodiment.
Figure 4:
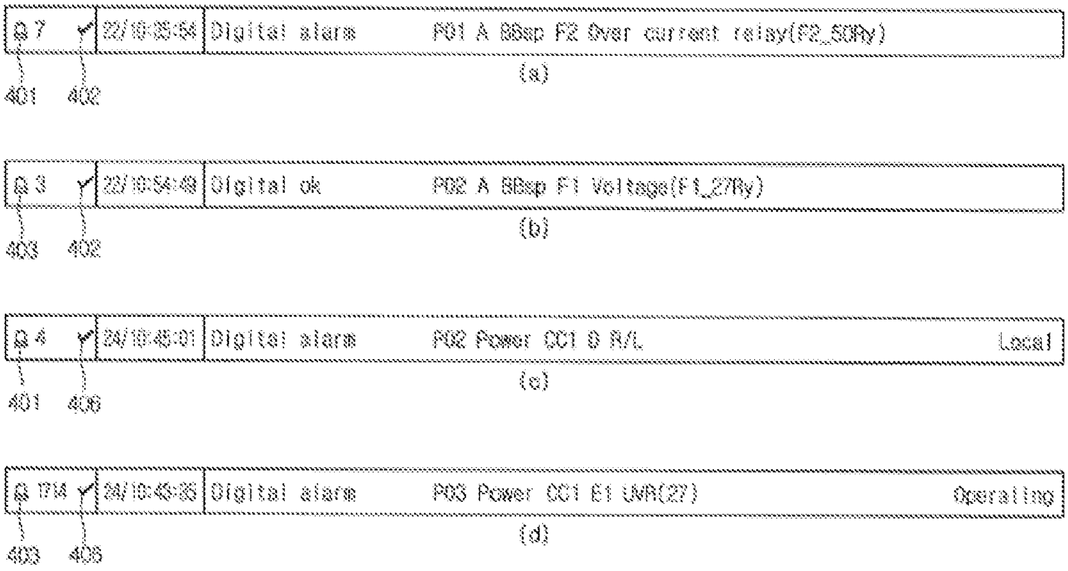
FIG. 4 is a view showing a screen image of an alarm queue display based on the state of an alarm in an alarm queue according to the embodiment.
Figure 5:
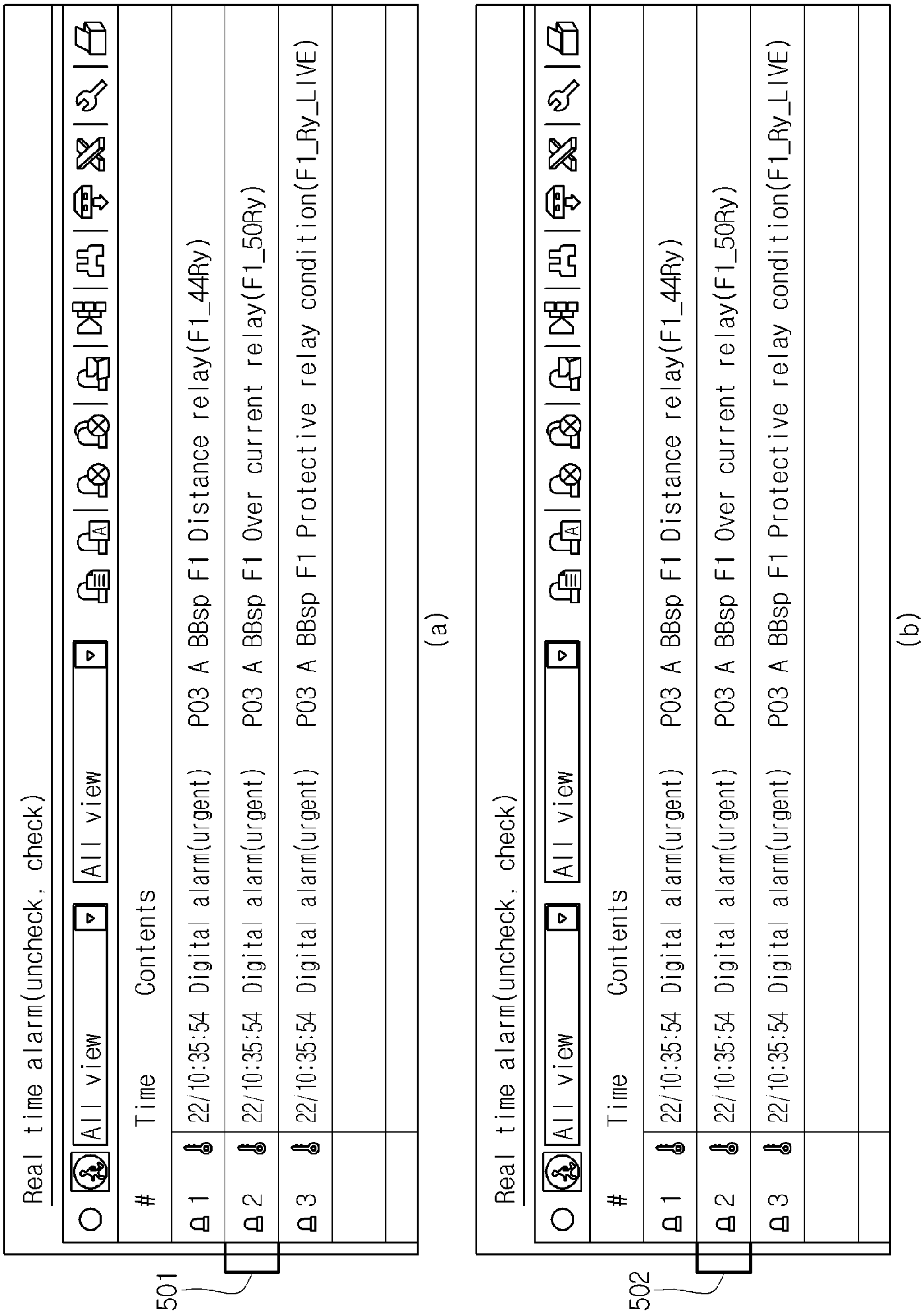
FIG. 5 is a view showing a screen image representing a state of an alarm displayed in an alarm queue when an important alarm is confirmed according to the embodiment.

FIG. 2 is a flowchart showing the procedure for setting the important alarms according to the embodiment, FIG. 3 is a view showing a screen image displaying the alarm queue according to the embodiment, FIG. 4 is a view showing a screen image of an alarm queue display based on the state of the alarm in the alarm queue according to the embodiment, and FIG. 5 is a view showing a screen image representing the state of the alarm displayed in the alarm queue when the important alarm is confirmed according to the embodiment.

Referring to FIGS. 2 to 5, upon receiving the request for the alarm queue display (step 202), the apparatus 100 confirms the alarm received in the alarm receiving unit 110 (step 204).

Then, the apparatus 100 displays the alarm queue including at least one confirmed alarm (step 206). FIG. 3 is a view showing the screen image displaying the alarm queue.

The alarm queue 300 may be displayed through the classification 301 of the important alarms and general alarms and the confirmation of the user for the alarms. In addition, the alarm queue 300 may include information 302 about the alarm generation time and information 303 about the position or sort of a system that receives the alarm.

FIG. 4 is a view showing the screen image of the alarm queue of FIG. 3, in which the alarms are displayed according to the classification of the important alarms, general alarms, confirmation of the user for the alarms and state information of the system.

FIG. 4(*a*) illustrates the display for the general alarm, which is not confirmed by the user, when the system is in an abnormal state. That is, the general alarm shown in FIG. 4(*a*) is generated when the system is in the abnormal state and is not confirmed by the user. The general alarm generated in the abnormal state of the system may be marked with a red warning light 401. In addition, the non-confirmation of the user may be marked with a red check image 402 and a field of the alarm generation time may flicker until the user confirms the alarm.

FIG. 4(*b*) illustrates the display for the general alarm, which is not confirmed by the user, when the system is in a normal state. That is, the general alarm shown in FIG. 4(*b*) is generated when the system is recovered to the normal state and is not confirmed by the user. The general alarm generated in the normal state of the system may be marked with a green warning light 403. In addition, the non-confirmation of the user may be marked with a red check image 402 and a field of the alarm generation time may flicker until the user confirms the alarm.

FIG. 4(*c*) illustrates the display for the general alarm, which has been confirmed by the user, when the system is in the abnormal state. That is, the general alarm shown in FIG. 4(*c*) is generated when the system is in the abnormal state and has been confirmed by the user. The general alarm generated in the abnormal state of the system may be marked with a red warning light 401. In addition, the confirmation of the user may be marked with a green check image 406.

FIG. 4(*d*) illustrates the display for the general alarm, which has been confirmed by the user, when the system is in the normal state. That is, the general alarm shown in FIG. 4(*d*) is generated when the system is in the normal state and has been confirmed by the user. The general alarm generated in the normal state of the system may be marked with a green warning light 403. In addition, the confirmation of the user may be marked with a green check image 406.

Then, the apparatus 100 determines whether there is an important alarm set by the user when displaying the alarm queue (step 208).

If it is determined that there is no important alarm, the apparatus 100 determines whether there is an alarm set by the user or matched with the important alarm condition (step 210).

If the important alarm has been set (step 212), the apparatus 100 displays the alarm in the alarm queue as the important alarm (step 214).

If it is determined that there is an important alarm when the alarm queue is displayed, the apparatus 100 determines whether the important alarm has been confirmed by the user (step 216). The confirmation of the user for the alarm can be carried out by activating the alarm or checking the conformation blank through the user input unit.

If the confirmation of the user for the alarm is not performed, the apparatus 100 keeps the alarm with the non-confirmation mark. As described above with reference to FIG. 4, the non-confirmation mark may be displayed by flickering the alarm or marking the alarm with the red key image.

If it is determined that the user has confirmed the important alarm, the apparatus 100 may display the important alarm with the confirmation mark. As described above with reference to FIG. 4, the confirmation of the user for the alarm may be displayed by marking the alarm with the green key image.

After that, the apparatus 100 determines whether the alarm notifying the recovery to the normal state is received from the system corresponding to the important alarm (step 222).

If the system corresponding to the important alarm is not recovered to the normal state, the apparatus 100 may display the alarm corresponding to the abnormal state of the system with the red warning light as described with reference to FIG. 4.

If the system corresponding to the important alarm has been recovered to the normal state, the apparatus 100 may display the alarm by changing the corresponding alarm into the general alarm (step 224). The alarm notifying the recovery to the normal state and the confirmation of the user may be displayed with the green warning light representing the normal state of the system as described with reference to FIG. 4.

FIG. 5(*a*) is a screen image that displays alarms which are not confirmed by the user from among the important alarms, and FIG. 5(*b*) is a screen image that displays the important alarms which have been confirmed by the user from the list shown in FIG. 5(*a*).

If one 501 of the important alarms displayed in the screen image shown in FIG. 5(*a*) has been confirmed by the user, an important alarm 502 marked with the green key image is displayed in the alarm queue as shown in FIG. 5(*b*).

Figure 6:
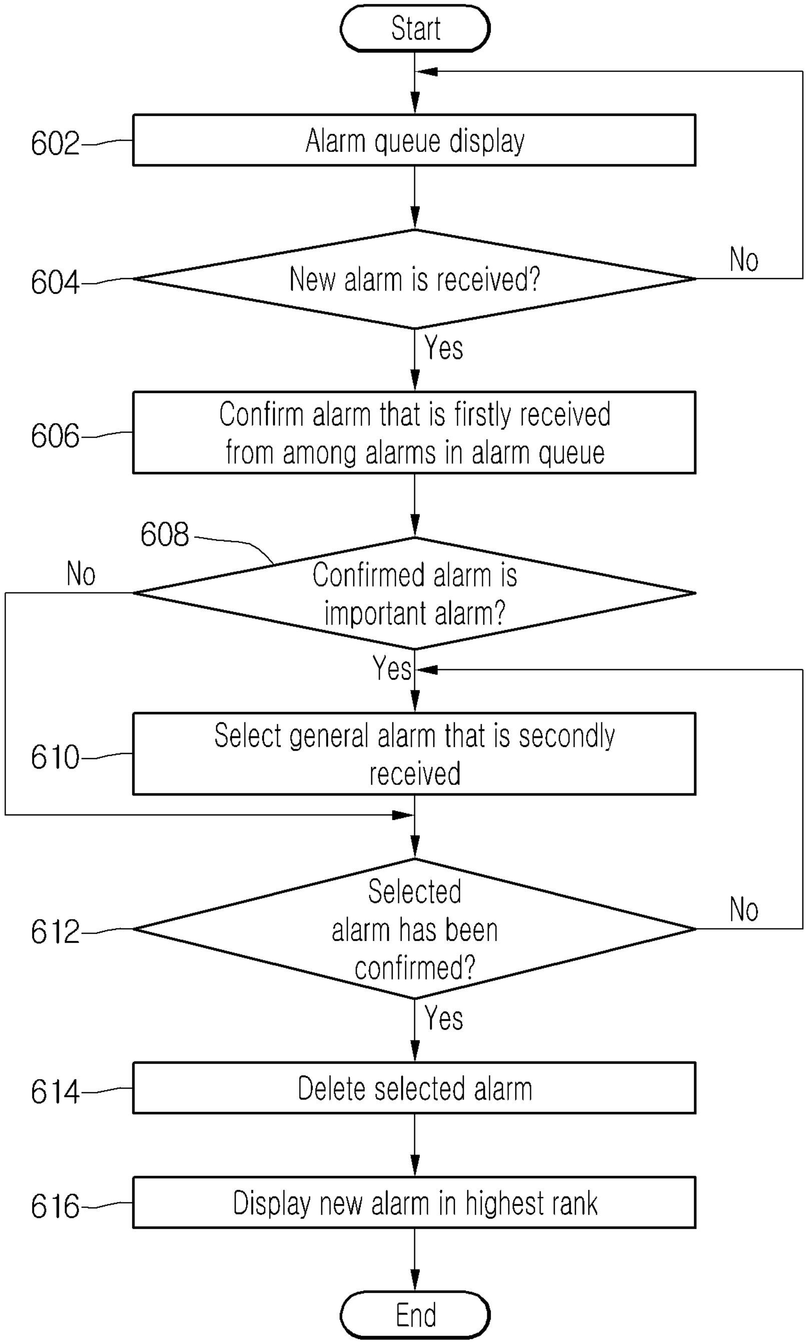
FIG. 6 is a flowchart showing the procedure for displaying new alarms received in an alarm queue according to the embodiment.
Figure 7A:
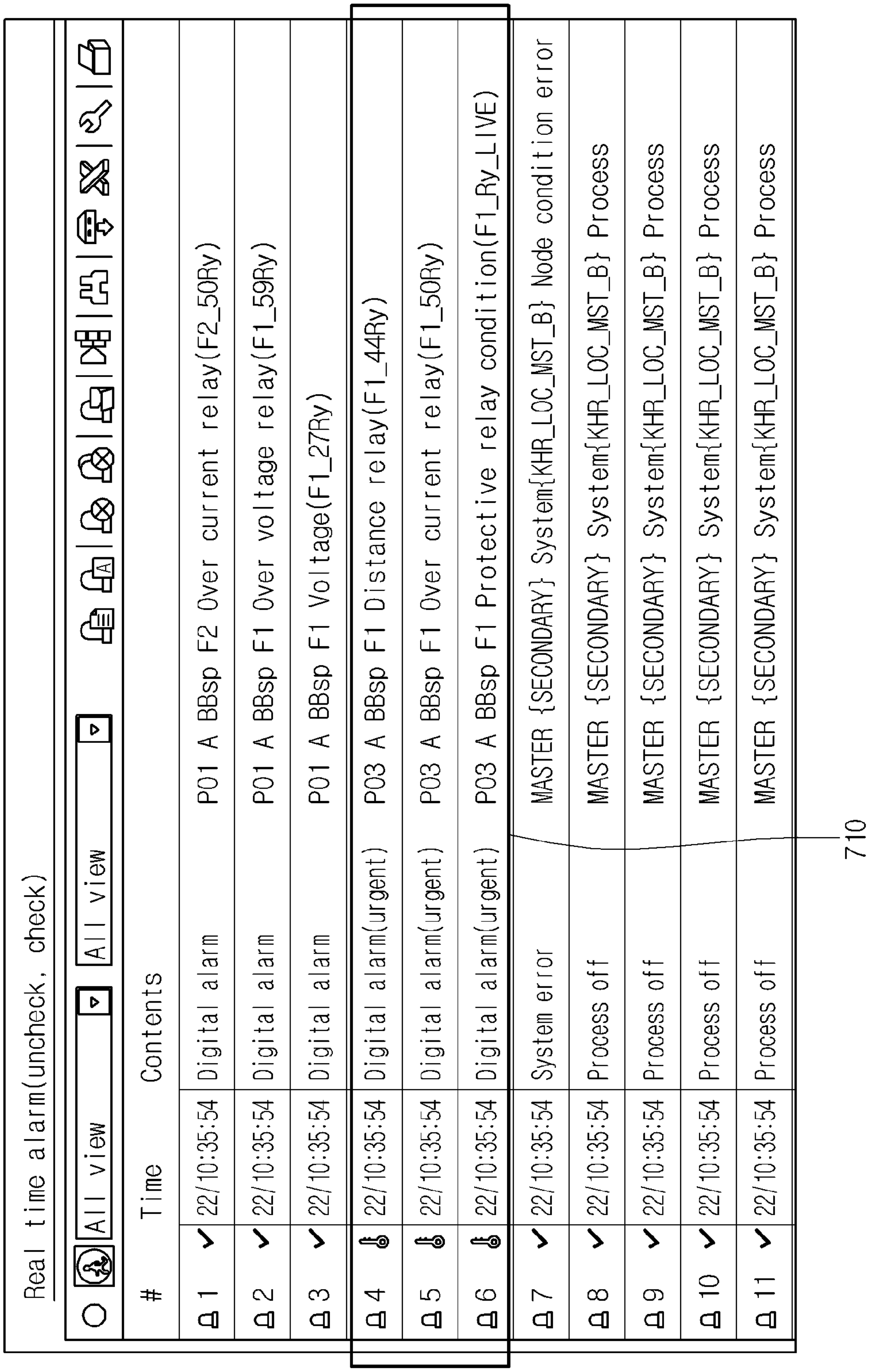
FIGS. 7*a* and 7*b* are views showing a screen image of an alarm queue according to an alarm display operation of FIG. 6.
Figure 7B:
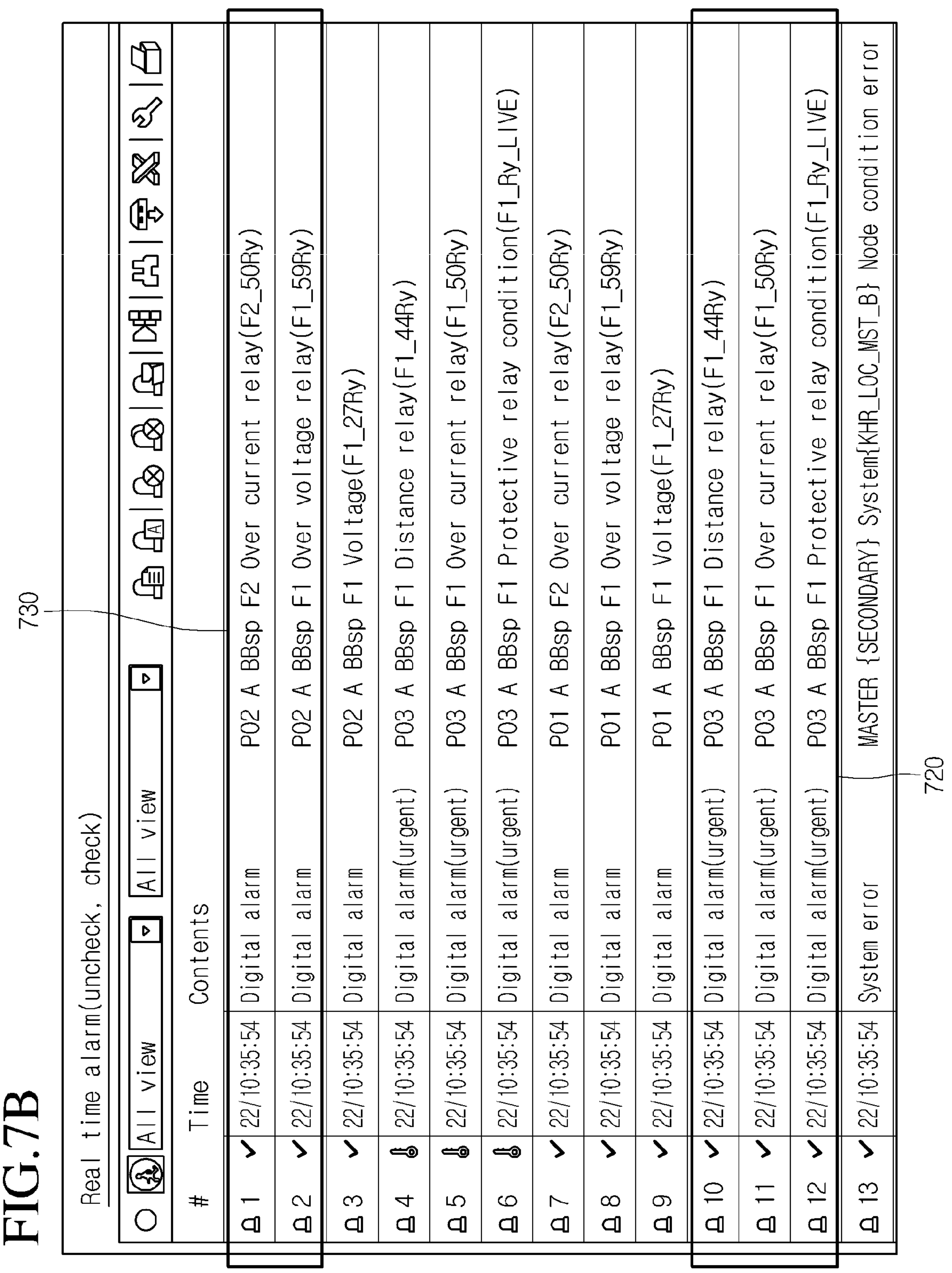

FIG. 6 is a flowchart showing the procedure for displaying new alarms received in the alarm queue according to the embodiment and FIG. 7 is a view showing a screen image of the alarm queue according to an alarm display operation of FIG. 6.

Referring to FIGS. 6 and 7, if a signal requesting the alarm queue display is detected (step 602), the apparatus 100 confirms the alarm received in the alarm receiving unit 110 (step 604).

That is, the apparatus 100 determines whether the new alarm is received (step 604).

The apparatus 100 confirms the alarm which is firstly received from among the alarms displayed in the alarm queue (step 606). In detail, the apparatus 100 confirms the alarm received prior to other alarms displayed in the alarm queue based on the alarm generation time through the FIFO (first input first out) scheme.

Then, the apparatus 100 determines whether the confirmed alarm is set as the important alarm (step 608).

If the confirmed alarm is the important alarm, the apparatus 100 confirms the general alarm which is secondly received (step 610). That is, the apparatus 100 extracts the alarm which is firstly received from among the general alarms other than the important alarms.

Then, the apparatus 100 determines whether the alarm has been confirmed by the user (step 612).

If the alarm has not been confirmed by the user, the procedure returns to step 610. In contrast, if the alarm which is firstly received from among the general alarms other than the important alarms has been confirmed by the user, the apparatus 100 deletes the alarm from the alarm queue (step 614). The deleted alarm may be stored in the memory unit 120.

The apparatus 100 displays the newly received alarm in the highest position in the alarm queue (step 616).

Referring to FIGS. 7(*a*) and 7(*b*), FIG. 7(*a*) illustrates the alarm queue including the important alarm which is not confirmed by the user in the abnormal state of the system and FIG. 7(*b*) illustrates the alarm queue including the alarm changed into the general alarm because the important alarm has been confirmed by the user or the system is recovered to the normal state. In addition, the newly received alarm is displayed in the highest position in the alarm queue.

As denoted with reference numeral 710 in FIG. 7(*a*), the important alarm, which is set by the user, is continuously displayed in the alarm queue. If the system corresponding to the important alarm is recovered to the normal state, the important alarm is changed into the general alarm and displayed with the red or green check image as shown in FIG. 7(*b*) according to the confirmation of the user.

In addition, if the important alarm is changed into the general alarm, the general alarm may be deleted from the alarm queue according to the alarm generation time as the new alarm is received and the new alarm is displayed in the highest position in the alarm queue as represented with reference numeral 730.

In the case that the important alarm is changed into the general alarm, the history of the general alarm may be displayed in the content of the alarm.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for managing alarms of a system, the method comprising:

receiving the alarms including state information of the system;

displaying an alarm queue including at least one of the received alarms;

setting important alarms from among the alarms in the displayed alarm queue; and deleting at least one important alarm from the alarm queue when a user confirms the at least one important alarm or a signal is received notifying a recovery to a normal state of a system corresponding to the at least one important alarm, wherein a displayed alarm is marked with an indicator of a first color on the alarm queue when the system is in an abnormal state, wherein the displayed alarm is marked with the indicator of a second color on the alarm queue when the system is in the normal state, wherein the displayed alarm is marked with a first image of the first color on the alarm queue when the alarm is a general alarm and is not confirmed by the user, wherein the displayed alarm is marked with the first image of the second color on the alarm queue when the alarm is the general alarm and is confirmed by the user, and wherein the displayed alarm is marked with a second image of the second color on the alarm queue when the alarm is an important alarm and is confirmed by the user.

2. The method of claim 1, further comprising sequentially deleting alarms from the alarm queue except for the important alarms according to an FIFO (first input first out) scheme that corresponds to a number of new alarms received from the system.

3. The method of claim 2, wherein the deleted alarms include confirmed alarms.

4. The method of claim 1, wherein the important alarms include at least one important alarm setting item preset by the user as state information.

5. The method of claim 1, further comprising:

causing the set important alarms in the alarm queue that are not confirmed to flicker.

6. An apparatus for managing alarms of a system, the apparatus comprising:

an alarm receiving unit that receives information;

a storing unit that stores information;

a display unit that displays information;

a user input unit that receives user inputs; and a control unit that:

controls the alarm receiving unit to receive alarms including state information of the system;

controls the storing unit to store information about the received alarms;

controls the display unit to display an alarm queue including at least one of the received alarms;

sets important alarms from among the alarms in the displayed alarm queue; and controls the display unit to delete at least one important alarm from the alarm queue when a user confirmation of the at least one important alarm is received via the user input unit or a signal is received notifying a recovery to a normal state of a system corresponding to the at least one important alarm, wherein a displayed alarm is marked with an indicator of a first color on the alarm queue when the system is in an abnormal state, wherein the displayed alarm is marked with the indicator of a second color on the alarm queue when the system is in the normal state, wherein the displayed alarm is marked with a first image of the first color on the alarm queue when the alarm is a general alarm and is not confirmed by the user, wherein the displayed alarm is marked with the first image of the second color on the alarm queue when the alarm is the general alarm and is confirmed by the user, and wherein the displayed alarm is marked with a second image of the second color on the alarm queue when the alarm is an important alarm and is confirmed by the user.

7. The apparatus of claim 6, wherein the control unit further controls the display unit to sequentially delete alarms from the alarm queue except for the important alarms according to an FIFO (first input first out) scheme when alarms satisfying a preset important alarm classification standard are received from the system.

8. The apparatus of claim 7, wherein the deleted alarms include confirmed alarms.

9. The apparatus of claim 6, wherein the control unit further controls the display unit to cause the set important alarms in the alarm queue that are not confirmed to flicker.

10. The apparatus of claim 6, wherein the important alarms include at least one important alarm setting item preset by the user as state information.

11. The method of claim 1, further comprising sequentially deleting alarms from the alarm queue except for the important alarms according to an FIFO (first input first out) scheme when alarms satisfying a preset important alarm classification standard are received from the system.

12. The apparatus of claim 6, wherein the control unit further controls the display unit to sequentially delete alarms from the alarm queue except for the important alarms according to an FIFO (first input first out) scheme that corresponds to a number of new alarms received from the system.

13. The method of claim 11, further comprising storing information about the deleted alarms.

14. The apparatus of claim 7, wherein controller further controls the storing unit to store information about the deleted alarms.

15. The method of claim 1, further comprising:

classifying the set important alarms in the alarm queue according to the confirmation.

16. The apparatus of claim 6, wherein the control unit further controls the display unit to classify the displayed important alarms according to the confirmation.

* * * * *